June 14, 1932.     B. H. ANIBAL     1,862,995
ENGINE LUBRICATING SYSTEM
Filed Sept. 29, 1928     2 Sheets-Sheet 2
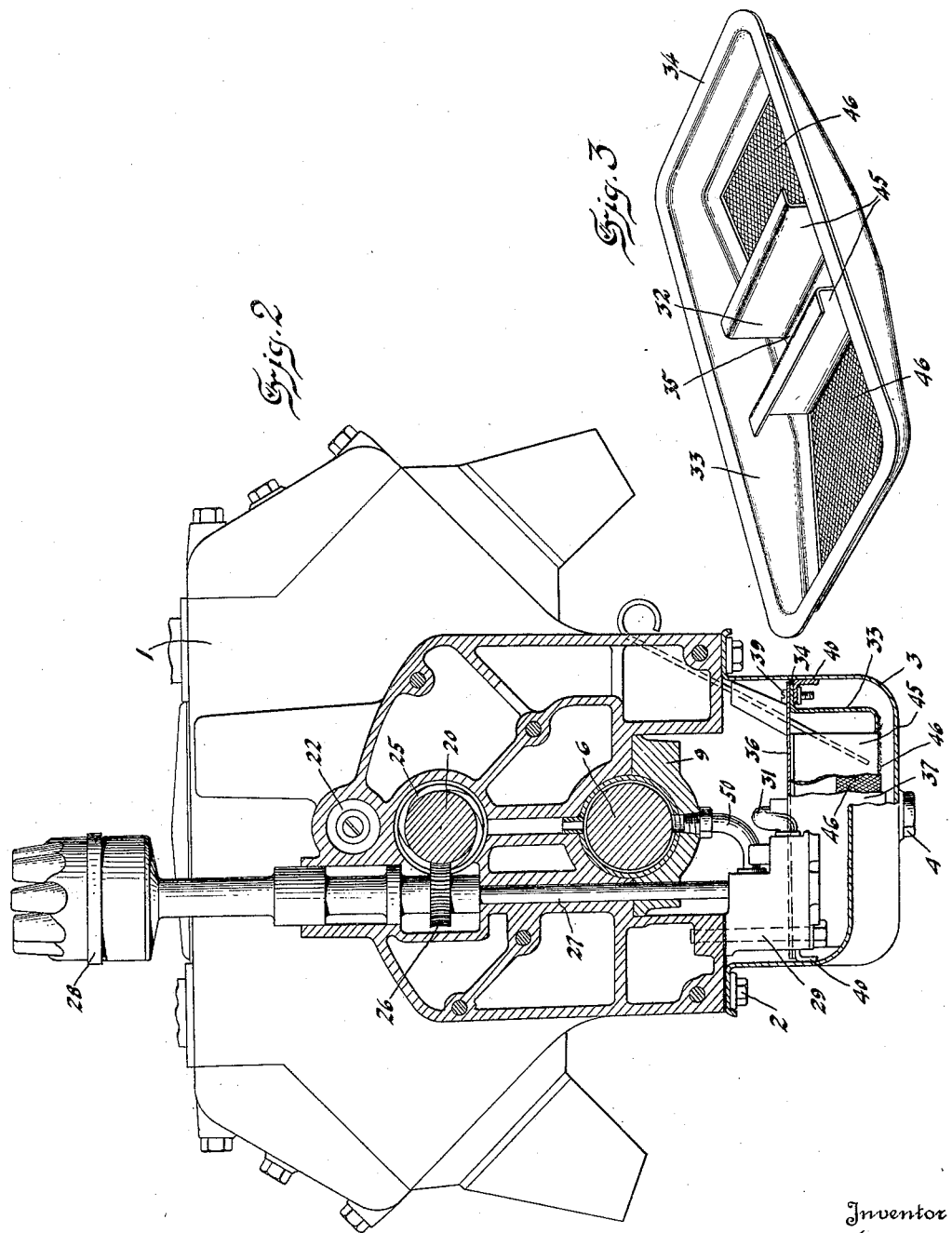
Inventor
Benjamin H. Anibal
By Blackmore, Spencer & Fluck
Attorneys Patented June 14, 1932

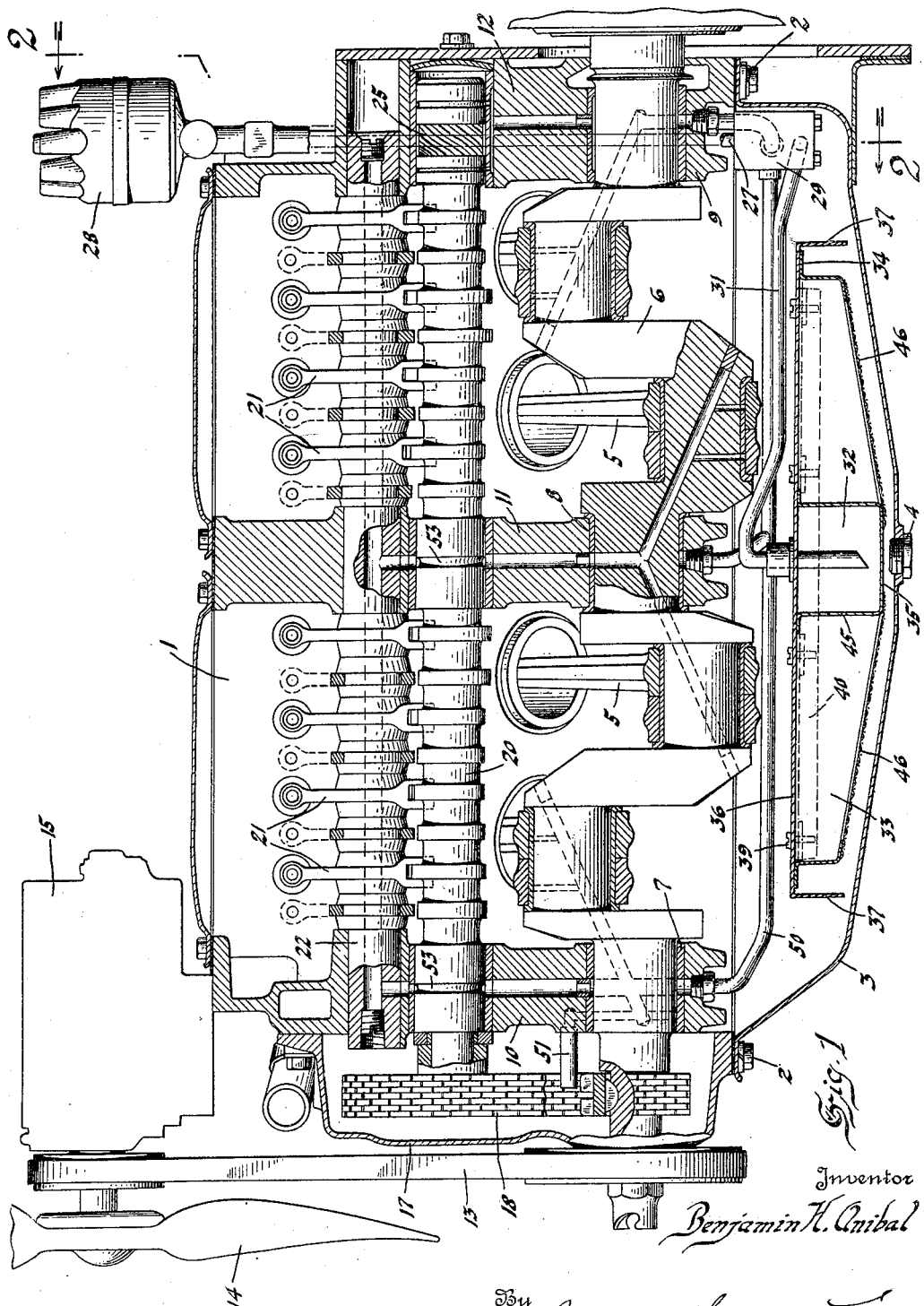

1,862,995

UNITED STATES PATENT OFFICE

BENJAMIN H. ANIBAL, OF PONTIAC, MICHIGAN, ASSIGNOR TO GENERAL MOTORS CORPORATION, OF DETROIT, MICHIGAN, A CORPORATION OF DELAWARE

ENGINE LUBRICATING SYSTEM

Application filed September 29, 1928. Serial No. 309,264.

This invention relates to lubricating systems for internal combustion engines such as are used in motor vehicles or the like.

It is an object of the invention to provide an improved lubricating system which will insure the delivery of clean oil in ample quantity for the positive lubrication of the bearing surfaces of the various moving parts.

A further object of the invention is to provide means for straining dirt and impurities from the oil before it reaches the pump that forces the oil to the bearings. Such straining means comprises a box-like member made from sheet metal and stamped or pressed to the desired shape and positioned within the engine oil pan, the bottom wall of the box-like member converging toward the center and having openings therein covered by a screen or perforated plate through which the oil flows upwardly to separate foreign matter therefrom, the inclination of the screen permitting the to and fro movement of the oil during car travel to wash dirt from the screen so that the screen will be in effect self-cleaning. To prevent surging and excessive movement of the oil, baffle plates are provided and in the present embodiment of the invention advantage is taken of the metal that is punched out of the bottom wall affording the openings to be covered with the screen, by turning such portions, which would ordinarily be wasted, upwardly at one end of the opening so as to form the baffle walls.

Another object of the invention is to provide a construction wherein the rocker arms controlling opening movement of the engine valves are pivotally mounted on a hollow shaft positioned directly above the cam shaft, whereby oil supplied to the rocker arm bearings through the hollow shaft will drop upon and serve to lubricate the cam surfaces.

Additional objects and advantages will be apparent from the following specification when taken in connection with the accompanying drawings illustrating a preferred embodiment of the invention and wherein Fig. 1 is a longitudinal section view of an engine; Fig. 2 is a sectional view taken on line 2—2 of Fig. 1; and Fig. 3 is a perspective view of the strainer tray.

In the drawings there is shown an eight-cylinder engine of the so-called V type, comprising an engine block 1 having two banks or rows of four cylinders each, that are arranged on an angle of substantially 90°. Secured by bolts 2 to the bottom of the crank case is an oil pan 3 having a convergent bottom wall and a drain plug 4 at its lowest point. The movement of the several pistons upon their explosion strokes is transmitted through connecting rods 5 to a crank shaft 6 mounted in bearings 7, 8, and 9 in the front wall 10, cross web 11 and rear wall 12 respectively. At its rear end the crank shaft drives transmission gearing in the customary manner, and at its front end carries a pulley having drive belt 13 to operate the radiator fan 14 and generator 15. Within a cover 17 bolted on the front of the engine is a sprocket chain 18 for driving from the crank shaft a cam shaft 20, having a bearing in the front wall 10, central cross web 11 and rear wall 12, respectively. The cams formed on the shaft 20 are adapted to engage with a series of rocker arms 21 pivotally mounted on the hollow shaft 22 positioned above the cam shaft, for controlling the intake and exhaust valves of the engine. At the rear end of the cam shaft 20 is formed a worm gear 25 that meshes with a pinion 26 on a vertical shaft 27 driving the ignition distributor 28 at its upper end and the oil pump 29 at its lower end.

The intake conduit 31 connected with the suction side of the pump extends into a chamber 32 formed in a tray suspended in the oil pan 3. The tray is formed or stamped from sheet metal and comprises a pan 33 having an outturned marginal flange 34 and a bottom wall that converges toward the straight central portion 35. Covering the pan 33 is a top plate 36 having down turned flanges 37 at each end, and beyond the pan 33 to provide splash plates. Screws 39 secure the top plate and marginal flange 34 to the top flange of the pair of angle bars 40 that are welded, or otherwise secured, to the side walls of the oil pan 33, thus suspending the tray in spaced relation with the walls of the oil pan. The bottom converging walls of the pan 33 are provided with openings formed by punching out and bending portions thereof upwardly, as at 45, to provide baffle walls and reduce the surging movement of the liquid in the pan. These openings are covered by a screen or strainer element 46, which is constantly washed and kept free of dirt by the to and fro movement of the oil during vehicle travel. The dirt and heavy particles of foreign material suspended in the oil tend to settle toward the bottom of the oil pan and work down the converging sides toward the drain plug 4, the screen 46 serving to separate the dirt and deleterious matter from the oil that passes upwardly therethrough into the pan 33 and around the sides of the walls 45 to the chamber 32.

Oil drawn through the suction line 31 is delivered by the pump through a manifold or conduit 50 having branches leading to each of the main bearings 7, 8, and 9. The crank shaft is provided with drilled passageways to permit the oil to reach the connecting rod bearings in the customary manner, and a tube or pipe 51 mounted in the front wall 10 provides for lubrication of the sprocket chain 18. Each of the end walls 10, center web 11, and rear end wall 12 are provided with passageways to allow the oil to reach the bearings of the cam shaft 20, the oil reaching the rearmost bearing also serving to lubricate the worm and pinions 25 and 26. The portions of the cam shaft having bearings in the walls, 10 and 11 are provided with annular grooves 53 to allow the oil to pass upwardly into the hollow shaft 21 from whence it flows thru suitable holes therein to the rocker arm bearings. Because of the location of the shafts 20 and 22 one above the other the lubricant drops from the rocker arm bearings onto the cam surfaces and so provides for the lubrication thereof.

While but one embodiment of the invention has been shown and described, it is to be understood that there is no intention to limit the invention to the exact form, but that modifications thereof might be made as come within the scope of appended claims.

I claim:

1. In an engine lubricating system, an oil pan, a tray suspended in the pan and formed from sheet metal, having sides and a bottom, a portion of the bottom being punched out and bent upwardly to provide a baffle wall inside the tray, a screen placed over the opening left by said upwardly punched baffle wall through which oil in the pan enters the tray, a cover for the top of the tray extending entirely across from side to side of the pan but terminating short of the end of the pan, and an oil pump delivering oil under pressure to the engine bearings and having its suction side communicating with the interior of the tray.

2. In an engine lubricating system, an oil pan, a pressed metal tray positioned in the pan and having side, end and bottom walls spaced from the corresponding walls of the pan and a top wall projecting beyond the side walls of the tray and over the space between said side walls and the walls of the pan to close the same, a portion of the bottom wall being punched out and bent upwardly to form a baffle plate within the tray, a strainer element secured over the opening in the bottom wall made by said punched out portion, and means to withdraw oil from within the tray for delivery to the engine bearings.

3. In an engine lubricating system, an oil pan, a pan suspended in the oil pan, a cover plate located over the top of the second pan and having downturned flanges at its ends beyond the pan to provide splash plates, baffle walls within the second pan formed by punching and bending a portion of the bottom wall of the pan upwardly, screens positioned over the openings in said bottom wall provided by the punched out portions, and means to withdraw oil from within the pan for delivery to the engine bearings.

4. In an engine lubricating system, an oil pan, a pan suspended in the oil pan having an inclined bottom wall provided with openings formed by punching and bending portions of the wall upwardly to afford baffle walls within the pan, screens positioned over the openings, an oil pump having its suction side communicating with the interior of said pan, a hollow shaft connected with pressure side of the pump, rocker arms pivotally mounted on said shaft and lubricated by the oil delivered to the shaft, and a cam shaft disposed beneath the hollow shaft to actuate the rocker arms whose cam surfaces are lubricated by the oil dripping from the rocker arm bearings.

In testimony whereof I affix my signature.

BENJAMIN H. ANIBAL.